(12) United States Patent
Woody et al.

(10) Patent No.: US 6,843,489 B2
(45) Date of Patent: Jan. 18, 2005

(54) AXLE DAMPING SYSTEM AND METHOD

(75) Inventors: Albert L. Woody, Dunlap, IL (US); Britt W. Gilmore, Belfast (IE)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 10/073,198

(22) Filed: Feb. 13, 2002

(65) Prior Publication Data

US 2003/0151224 A1 Aug. 14, 2003

(51) Int. Cl.$^7$ ............................................. B60G 9/02
(52) U.S. Cl. ........................ 280/124.112; 280/5.508; 280/124.158; 280/124.159
(58) Field of Search ................... 280/124.112, 124.1, 280/124.11, 124.111, 124.157, 124.158, 124.159, 5.5, 5.502, 5.505, 5.506, 5.508, 5.509, FOR 165, FOR 166, FOR 171

(56) References Cited

U.S. PATENT DOCUMENTS

| | | |
|---|---|---|
| 1,647,518 A | 11/1927 | Hawley, Jr. |
| 3,572,746 A | 3/1971 | Mueller |
| 3,759,541 A | 9/1973 | Peterson |
| 3,811,699 A | 5/1974 | Casey |
| 3,826,388 A | 7/1974 | Oldenburg et al. |
| 3,951,432 A | 4/1976 | Crovatto et al. |
| 5,149,131 A | 9/1992 | Sugasawa et al. |
| 5,379,857 A | 1/1995 | Niederhofer |
| 5,568,841 A | 10/1996 | Weissbach |
| 5,802,847 A | 9/1998 | Harnischfeger |
| 6,131,918 A | * 10/2000 | Chino ..................... 280/6.154 |
| 6,209,321 B1 | 4/2001 | Ikari |

FOREIGN PATENT DOCUMENTS

| | | | |
|---|---|---|---|
| DE | 4100236 A1 | * 7/1991 | ........ 280/FOR 171 |
| DE | 198 09 125 A1 | 3/1999 | |
| EP | 0 485 732 A2 | 5/1992 | |
| EP | 0 867 315 A2 | 9/1998 | |

\* cited by examiner

*Primary Examiner*—Eric Culbreth
(74) *Attorney, Agent, or Firm*—Finnegan, Henderson, Farabow, Garrett & Dunner

(57) ABSTRACT

A damping system for an axle configured to pivot about a pivot point is provided. The damping system includes a first hydraulic cylinder having a first chamber and a second chamber and a second hydraulic cylinder having a third chamber and a fourth chamber. The first hydraulic cylinder is connected to the axle on one side of the pivot point and the second hydraulic cylinder is connected to the axle on the other side of the pivot point. A first fluid line connects the first chamber with the fourth chamber. A second fluid line connects the second chamber with the third chamber. A restricted fluid passageway connects the first fluid line and the second fluid line. A valve mechanism is disposed between the first fluid line and the second fluid line and is operable to release fluid from one of the first and second fluid lines when the pressure of the fluid in the one of the first and second fluid lines reaches a predetermined level.

18 Claims, 2 Drawing Sheets

AXLE DAMPING SYSTEM AND METHOD

TECHNICAL FIELD

The present invention is directed to a method and system for damping an axle. More particularly, the present invention is directed to a system and method of damping oscillations in an axle of a work machine.

BACKGROUND

Work machines are commonly used to move heavy loads, such as earth, construction material, and/or debris. These work machines, which may be, for example, wheel loaders, excavators, bull dozers, backhoes, and track loaders, typically include different types of work implements that are designed to perform various moving tasks.

During the course of ordinary operation, it is often necessary for a work machine to move about a work site after its work implement has been raised to an elevated position. For example, when a wheel loader is removing earth, debris, or other material from a job site, the wheel loader may need to travel between a loading site and a dumping site. At the loading site, the wheel loader may load material into its bucket when the work implement is in a lowered position. The wheel loader may then raise the bucket to an elevated position and travel to the dumping site, so that the bucket can be positioned over a dump truck, or other removal vehicle. The wheel loader may then dump the material from the bucket into the dump truck and return to the loading site to repeat the process.

Depending upon the job site, the work machine may need to travel over terrain that is rough or uneven when moving between the loading site and the dumping site. Typically, the work machine includes two or more axles that pivotally support a frame or chassis. The rough or uneven terrain may cause the chassis of the work machine to pivot with respect to the axles. The pivoting, or oscillations, in the chassis results in a lateral rocking of the work machine as the work machine moves over the rough terrain. The magnitude of the oscillations may be increased when the work machine is carrying a load in the elevated position.

Because the cabs of the work machines are typically elevated to provide the operator with a better view of the job site, the operator is usually very sensitive to these oscillations. If the oscillations rise above a certain magnitude or reach a certain frequency, the operator may sense that the work machine is unstable. Under these circumstances, the operator may reduce the size of the carried loads to reduce the magnitude of the oscillations and restore a feeling of stability in the work machine. When the operator reduces the size of the loads carried by the work machine, the efficiency of the work machine is decreased accordingly.

The current trend in waste removal vehicles, such as dump trucks, is to increase the height of the vehicles. To compensate, the work machines will need to raise their loads higher to dump material into the waste removal vehicles. As the height of the load increases, so does the likelihood that the work machine will experience oscillations when traveling over rough terrain.

To improve the stability of a work machine and decrease the magnitude of oscillations, several factors on the work machine may be modified. For example the size of the wheel base, i.e. the distance between the wheels may be increased. However, in many cases, the width of the work machine may not exceed the width of the work implement. Thus, there are limits to the amount by which the width of the work machine may be increased.

The work machine may also be equipped with a shock absorbing or damping system to reduce the effects of traveling over rough or uneven terrain. One example of a damping system is described in U.S. Pat. No. 5,149,131. However, these system are typically designed to reduce the effect of a shock to both wheels on an axle and will not reduce or prevent lateral rocking of the work machine.

The damping system of the present invention solves one or more of the problems set forth above.

SUMMARY OF THE INVENTION

One aspect of the present invention is directed to a damping system for an axle configured to pivot about a pivot point. The damping system includes a first hydraulic cylinder connected to the axle on one side of the pivot point and having a first chamber and a second chamber. A second hydraulic cylinder is connected to the axle on the other side of the pivot point and has a third chamber and a fourth chamber. A first fluid line connects the first chamber with the fourth chamber and a second fluid line connects the second chamber with the third chamber. A restricted fluid passageway connects the first fluid line and the second fluid line. A valve mechanism is disposed between the first fluid line and the second fluid line and is operable to release fluid from one of the first and second fluid lines when the pressure of the fluid in the one of the first and second fluid lines reaches a predetermined level.

In another aspect, the present invention is directed to a method of damping an axle. A first hydraulic cylinder having a first chamber and a second chamber is connected to one end of the axle. A second hydraulic cylinder having a third chamber and a fourth chamber is connected to the other end of the axle. The first chamber is placed in fluid communication with the fourth chamber through a first fluid line and the second chamber is placed in fluid communication with the third chamber through a second fluid line. A restricted flow of fluid is allowed between the first fluid line and the second fluid line. Fluid is released from one of the first and second fluid lines when the pressure of the fluid in the one of the first and second fluid lines reaches a predetermined pressure level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
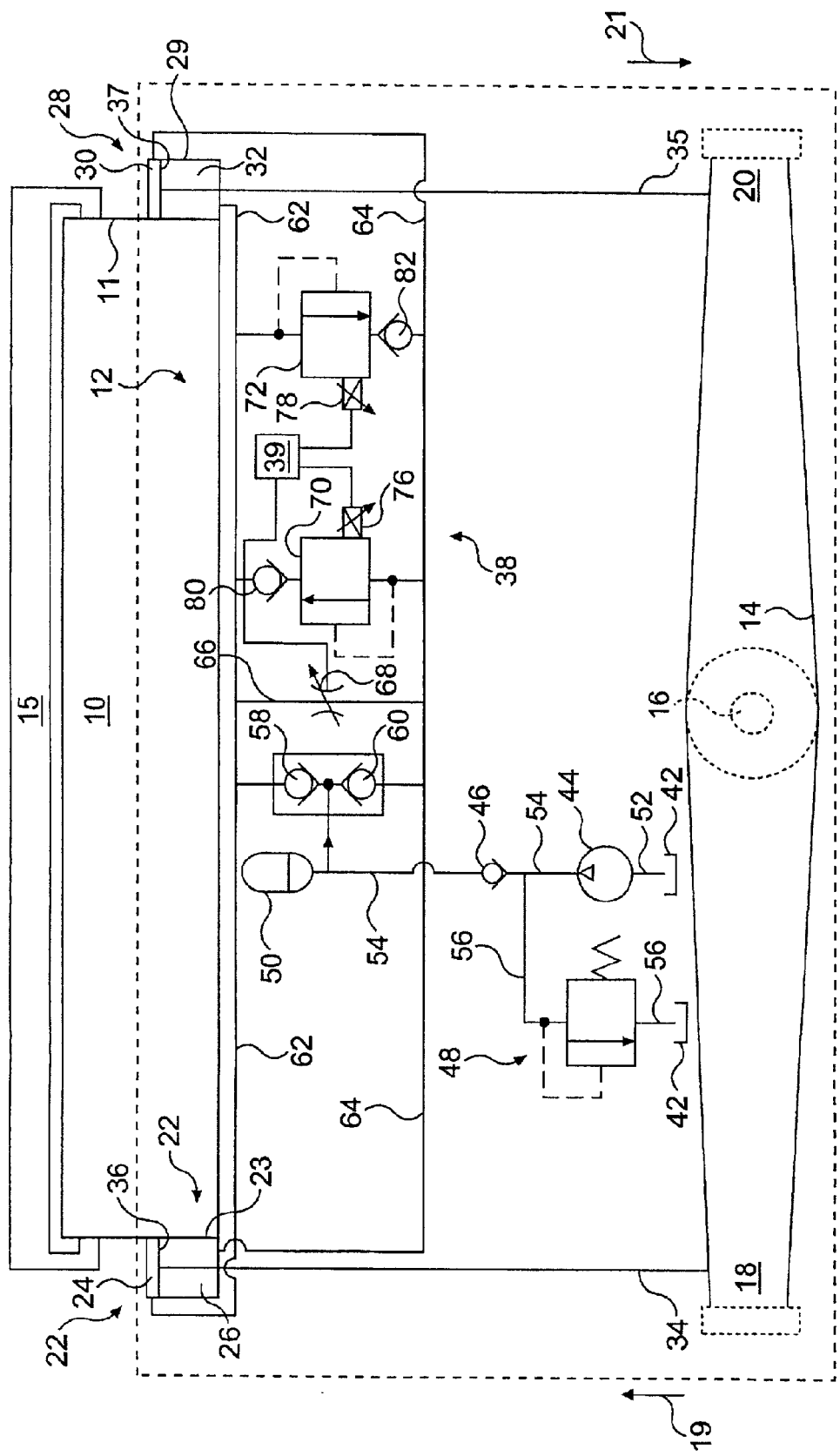
FIG. 1 is a schematic and diagrammatic illustration of an axle damping system in accordance with an exemplary embodiment of the present invention.

As diagrammatically illustrated in FIG. 1, a damping system 12 for a work machine 10 is provided. Work machine 10 may be any type of wheeled machine commonly used to move heavy loads, such as, for example, earth, construction material, or debris. Work machine 10 may be, for example, a wheel loader.

Figure 2:
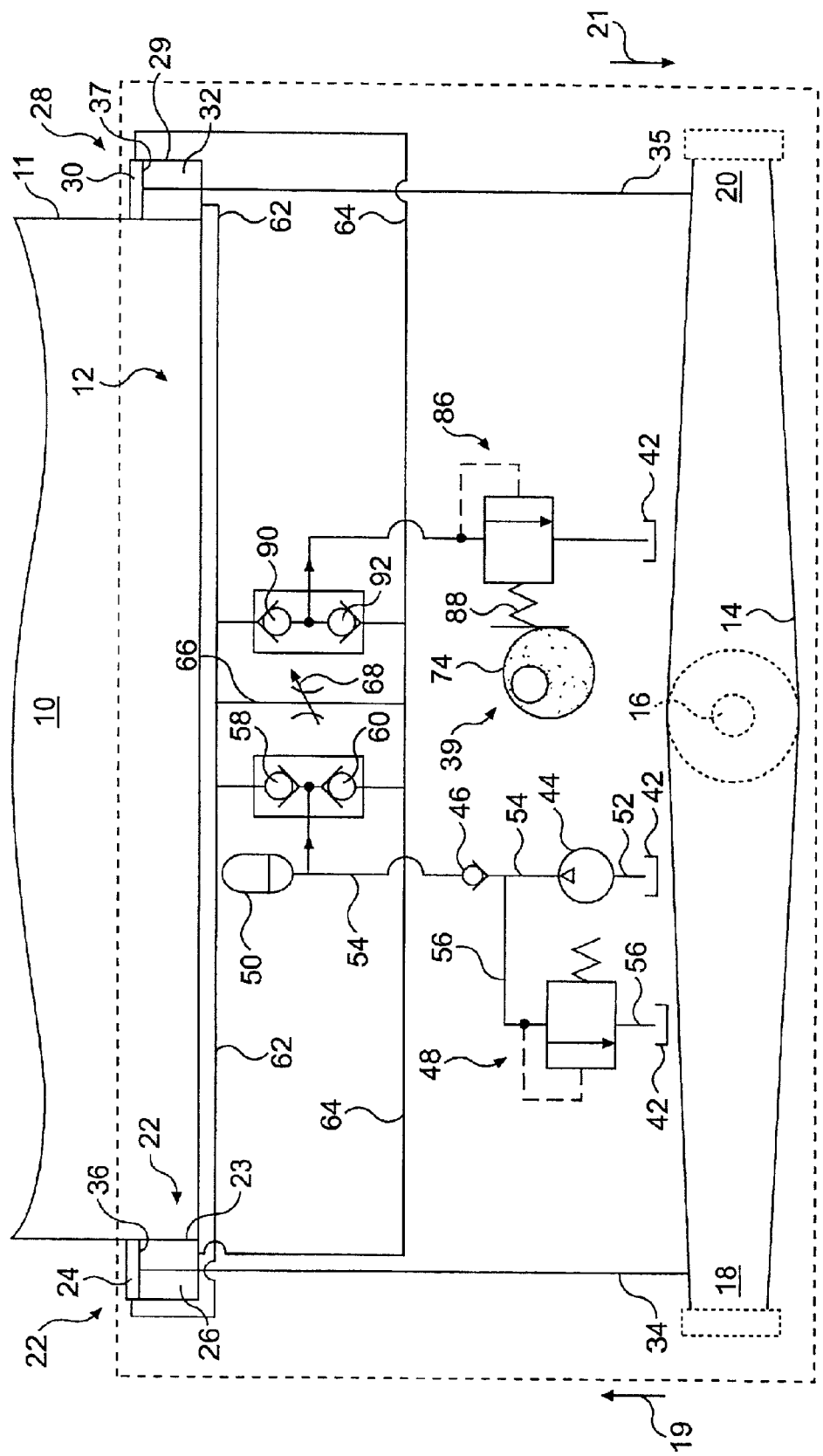
FIG. 2 is a schematic and diagrammatic illustration of an axle damping system in accordance with another exemplary embodiment of the present invention.

As also illustrated in FIGS. 1 and 2, work machine 10 includes an axle 14. With reference to FIG. 1, axle 14 is mounted on a chassis 11 of work machine 10 for pivoting movement about a pivot point 16. In one exemplary embodiment, axle 14 is the rear axle of work machine 10.

As also shown in FIG. 1, damping system 12 includes a first hydraulic cylinder 22. First hydraulic cylinder 22 includes a housing 23, a rod 34, and a piston 36. Rod 34 is connected to piston 36 and is slidably disposed in housing 23. Piston 36 defines a first chamber 24 and a second chamber 26 within housing 23. In the disclosed embodiment, first chamber 24 may also be referred to as the head end of first hydraulic cylinder 22 and second chamber 26 may also be referred to as the rod end of first hydraulic cylinder 22.

Rod 34 of first hydraulic cylinder 22 is connected to a first end 18 of axle 14. Rod 34 may be connected to axle 14 at any point between pivot point 16 and first end 18. Any fastening device readily apparent to one skilled in the art may be used to connect rod 34 to axle 14. For example, a pinned connection that allows rod 34 to pivot with respect to axle 14 may be used as the fastening device.

Damping system 12 also includes a second hydraulic cylinder 28. Second hydraulic cylinder 28 includes a housing 29, a rod 35, and a piston 37. Rod 35 is connected to piston 37 and is slidably disposed in housing 29. Piston 37 defines a third chamber 30 and a fourth chamber 32. In the disclosed embodiment, third chamber may also be referred to as the head end of second hydraulic cylinder 28 and fourth chamber 32 may also be referred to as the rod end of second hydraulic cylinder 28.

Rod 35 of second hydraulic cylinder 28 is connected to a second end 20 of axle 14. Rod 35 may be connected to axle 14 at any point between pivot point 16 and second end 20. Any fastening device readily apparent to one skilled in the art may be used to connect rod 35 to axle 14. For example, a pinned connection that allows rod 35 to pivot with respect to axle 14 may be used as the fastening device.

As illustrated in FIG. 1, first and second hydraulic cylinders 22 and 28 are disposed between axle 14 and chassis 11. Housings 23 and 29 of first and second hydraulic cylinders 22 and 28, respectively, are fixed to chassis 11 of work machine 10. When axle 14 pivots about pivot point 16 relative to chassis 11, the connection between the axle and rods 34 and 35 cause pistons 36 and 37 to move relative to housings 23 and 29 of first and second hydraulic cylinders 22 and 28, respectively.

Because first hydraulic cylinder 22 and second hydraulic cylinder 28 are connected to axle 14 on opposite sides of pivot point 16, an oscillation in axle 14 will cause the pistons in first and second hydraulic cylinders 22 and 28 to move in opposite directions. For example, if axle 14 were to move so that first end 18 of axle 14 moves in the direction of arrow 19 and second end 20 of axle 14 moves in the direction of arrow 21, piston 36 of first hydraulic cylinder 22 would move in the direction of arrow 19, whereas piston 37 of second hydraulic cylinder 28 would move in the direction of arrow 21.

As illustrated in FIG. 1, a first fluid line 62 connects first chamber 24 of first hydraulic cylinder 22 to fourth chamber 32 of second hydraulic cylinder 28 and second fluid line 64 connects second chamber 26 of first hydraulic cylinder 22 to third cylinder 30 of second hydraulic cylinder 28. In other words the two hydraulic cylinders are cross-connected so that the head end of one cylinder is in fluid connection with the rod end of the other cylinder.

As illustrated in FIG. 1, a source of pressurized fluid 44 supplies pressurized fluid to damping system 12. Source of pressurized fluid 44 may be any device readily apparent to one skilled in the art as capable of working a fluid to a certain pressure. For example, source of pressurized fluid 44 may be a variable or fixed capacity pump.

Source of pressurized fluid 44 is connected to a tank 42 by a fluid line 52. Source of pressurized fluid 44 draws fluid from tank 42 and works the fluid to a certain pressure. The fluid is then directed through fluid line 54.

A check valve 46 may be disposed in fluid line 54 to prevent a reverse flow of fluid back to source of pressurized fluid 44. In addition, a pressure relief valve 48 may be connected to fluid line 54 by a fluid line 56. If the pressure of the fluid in fluid line 54 exceeds a predetermined limit, pressure relief valve 48 may open to allow fluid to flow through fluid line 56 and return to tank 42.

Fluid pressurized by source of pressurized fluid 44 is directed through fluid line 54 to an accumulator 50. Accumulator 50 maintains a supply of pressurized fluid. Accumulator 50 is connected to first fluid line 62 and second fluid line 64. A check valve 58 may be disposed between accumulator 50 and first fluid line 62 to prevent a reverse flow of fluid from first fluid line 62 towards accumulator 50. Similarly, a check valve 60 may be disposed between accumulator 50 and second fluid line 64 to prevent a reverse flow of fluid from second fluid line 64 towards accumulator 50.

Fluid from source of pressurized fluid 44 and accumulator 50 is allowed to flow into damping system 12. Accumulator 50 may maintain an adequate supply of pressurized fluid to ensure that damping system 12 remains filled and prevent the development of air pockets in the system.

As illustrated in FIG. 1, a restricted fluid passageway 66 connects first fluid line 62 with second fluid line 64. Restricted fluid passageway 66 may include an orifice 68 that restricts the flow of fluid between first fluid line 62 and second fluid line 64. Orifice 68 may be variable in size or may be fixed in size. For example, orifice 68 may be defined by an adjustable valve or any other mechanism configured to vary the rate of fluid flow between first fluid line 62 and second fluid line 64. The size of orifice 68 may depend upon the particular work machine, the particular application, and/or the particular operating conditions.

As shown in FIG. 1, damping system 12 may include a control mechanism 39. Control mechanism 39 may be operable to control the amount of fluid allowed to pass through restricted fluid passageway 66. Control mechanism 39 may adjust orifice 68 by changing the position of an adjustable valve based on the operating conditions of the work machine. For example, control mechanism 39 may decrease the size of orifice 68 to decrease the amount of fluid passing through restricted fluid passageway 66 when a work implement 15 is in an elevated position. Alternatively, control mechanism 39 may receive input directly from an operator.

As further illustrated in FIG. 1, a valve mechanism 38 is disposed between first fluid line 62 and second fluid line 64.

In the exemplary embodiment of FIG. 1, valve mechanism 38 includes a first pressure relief valve 70 and a second pressure relief valve 72.

First pressure relief valve 70 is configured to allow fluid to flow from second fluid line 64 to first fluid line 62 when the pressure of the fluid within second fluid line 64 is greater than a predetermined pressure level. First pressure relief valve 70 includes a solenoid 76 that determines the pressure level at which first pressure relief valve 70 will open. When solenoid 76 is energized, the predetermined pressure limit may be increased proportionally to the amount of current applied to solenoid 76. When solenoid 76 is de-energized, the predetermined pressure limit may be decreased.

Second pressure relief valve 72 is configured to allow fluid to flow from first fluid line 62 to second fluid line 64 when the pressure of the fluid within first fluid line 62 is greater than a predetermined pressure level. Second pressure relief valve 72 includes a solenoid 78 that determines the pressure level at which second pressure relief valve 72 will open. When solenoid 78 is energized, the predetermined pressure limit may be increased proportionally to the amount of current applied to solenoid 78. When solenoid 78 is de-energized, the predetermined pressure limit may be decreased.

Control mechanism 39 may also be operable to energize or de-energize solenoids 76 and 78. Control mechanism 39 may determine the amount of current to apply to solenoids 76 and 78 based on operating conditions, such as, for example, the height of the work implement of the work machine. Alternatively, an operator may provide input to control mechanism 39 to control solenoids 76 and 78.

A check valve 80 may be disposed between first fluid line 62 and first pressure relief valve 70 to prevent a reverse flow of fluid from first fluid line 62 through first pressure relief valve 70. Similarly, a check valve 82 may be disposed between second fluid line 64 and second pressure relief valve 72 to prevent a reverse flow of fluid from second fluid line 64 through second pressure relief valve 72.

Damping system 12 will act to dampen the effects of a torque exerted on axle 14 when work machine 10 is traveling over rough or uneven terrain. For example, work machine 10 may encounter a rut or a bump that exerts an impulse force on one end of axle 14. The impulse force may act on axle 14 to pivot axle 14 in a clockwise direction about pivot point 16 (i.e. first end 18 moves in a direction as indicated by arrow 19 and second end moves in a direction as indicated by arrow 21). The corresponding torque of axle 14 results in the exertion of a force that acts on piston 36 of first hydraulic cylinder 22 to move piston 36 in the direction of arrow 19. In addition, a force is exerted on piston 37 of second hydraulic cylinder 28 that acts to move piston 37 in the direction of arrow 21.

The cross-connection of first and second hydraulic cylinders 22 and 28 acts to oppose the torque of axle 14. The force exerted on piston 36 is translated to an increase in the pressure of the fluid in first fluid line 62. The increase in pressure in first fluid line 62, in turn, exerts a force on piston 37 in second hydraulic cylinder 28. However, this force is opposed by the force exerted by axle 14 on piston 37. Assuming that the fluid in first fluid line 62 and in first and fourth chamber 24 and 32 is incompressible, the fluid wilt prevent either piston 36 or 37 from moving relative to the respective housing 23 or 29. In other words, unless fluid is allowed to escape from first fluid line 62, first chamber 24, or fourth chamber 32, axle 14 will not be able to pivot relative to chassis 11 and the impulse force will act, in its entirety, on chassis 11.

Orifice 68 in restricted fluid passageway 66 may allow fluid to flow from first fluid line 62 to second fluid line 64. The pressure of the fluid in first fluid line 62 may be greater than the pressure of the fluid in the second fluid line 64, resulting in a pressure differential across orifice 68. As fluid flows through orifice 68 some of the energy of the pressurized fluid will be dissipated as heat when the pressure of the fluid decreases over orifice 68. Thus, some of the energy created by the exertion of the impulse force on axle 14 will be dissipated. As a result, the magnitude of the force exerted on chassis 11 may be dampened, or decreased.

The amount of energy dissipated through orifice 68 may depend upon the rate at which fluid is allowed to flow through orifice 68. For example, if the size of orifice 68 is increased to allow a greater flow rate of fluid, the amount of dissipated energy, i.e. the amount of dampening, may also be increased. Likewise, decreasing the size of orifice to reduce the rate of fluid flow between first and second fluid lines 62 and 64 may result in a decreased dissipation of energy and a decreased dampening effect.

First and second pressure relief valve 70 and 72 are operable to increase the dampening effect by dissipating additional energy under certain circumstances. As described previously, second pressure relief valve 72 may open to allow additional fluid to flow from first fluid line 62 to second fluid line 64 when the pressure in first fluid line 62 exceeds a predetermined limit. If work machine encounters a significant rut or bump causing a sharp impulse force against axle 14, the pressure in fluid line 62 may spike. If the pressure rises above a predetermined limit, second pressure relief valve 72 will open to allow additional fluid to flow to second fluid line 64. This will result in the dissipation of additional energy and an increased dampening effect. When the pressure decreases below the predetermined limit, second pressure relief valve 72 will close and prevent the flow of additional fluid to second fluid line 64.

Control mechanism 39 may adjust the dampening effect to account for different operating conditions. For example, when work machine 10 is traveling with a work implement held in an elevated position, control mechanism 39 may adjust damping system 12 to increase the dissipation of energy and the damping effect. Control mechanism 39 may also increase or decrease the damping effect of damping system 12 under other operating conditions.

Control mechanism 39 may adjust the dampening effect of damping system 12 in a number of ways. For example, when a particular operating condition is experienced, control mechanism 39 may increase or decrease the size of orifice 68. In addition, control mechanism may increase or decrease the predetermined pressure at which second pressure relief valve 72 will open.

If work machine 10 is carrying a load in an elevated position, control mechanism 39 may increase the damping effect of damping system 12 to provide the operator with a greater feel of stability. Control mechanism 39 may increase the size of orifice 68 and/or decrease the predetermined pressure limit at which second pressure relief valve 72 will open. Each of these adjustments will increase the amount of energy dissipated in damping system 12 when an impulse force is absorbed by axle 14. Thus, damping system 12 will decrease the lateral rocking experienced by the operator.

When the load is dumped or returned to a lower position, control mechanism 39 may decrease the damping effect of damping system 12. This may be accomplished by decreasing the size of orifice 68 and/or increasing the predetermined pressure limit at which second pressure relief valve 72 will open.

Damping system 12 will also act to dampen an impulse force that acts to exert a counter-clockwise torque on axle 14. In this situation, counter-acting forces will be exerted on the fluid in second chamber 26 and third chamber 30 through pistons 36 and 37. This force will act to increase the pressure of the fluid in second fluid line 64. Orifice 68 will dissipate some of the energy created by the exerted impulse force by allowing fluid to flow from second fluid line 64 to first fluid line 62. If the pressure within second fluid line 64 reaches the predetermined pressure limit, first pressure relief valve 70 will open to allow additional fluid to flow from second fluid line 64 to first fluid line 62 to further dissipate the energy created by the impulse force. Control mechanism 39 may adjust the damping effect of damping system in the counter-clockwise direction by adjusting the size of orifice 68 and/or adjusting the predetermined pressure limit.

As shown in the exemplary embodiment of FIG. 2, pressure relief from both first fluid line 62 and second fluid line 64 may be controlled by a single pressure relief valve 86. A fluid line 84 may connect pressure relief valve 86 with first fluid line 62 and second fluid line 64. A check valve 90 may be configured to prevent a reverse flow of fluid from fluid line 84 into first fluid line 62. Another check valve 92 may be configured to prevent a reverse flow of fluid from fluid line 84 into second fluid line 64.

With this configuration, fluid may flow from both first fluid line 62 and second fluid line 64 to pressure relief valve 86. If the pressure within either of first fluid line 62 or second fluid line 64 reaches the predetermined pressure limit, relief valve 86 may open to allow fluid to flow to tank 42. Make-up fluid to replace the release fluid may be provided by accumulator 50 or by source of pressurized fluid 44.

Pressure relief valve 86 may also include a spring 88 that acts to increase or decrease the predetermined pressure limit. Control mechanism 39 may include a cam 74 that acts on spring 88 to modify the predetermined pressure limit at which pressure relief valve 86 will open to allow fluid to be released from damping system 12. In this manner, control mechanism 39 may be operated to increase or decrease the effects of damping system 12.

Industrial Applicability

As will be apparent from the foregoing description, the present invention provides a damping system for an axle of a work machine. The damping system acts to dampen the effects of a torque exerted on the axle, such as may be experienced when the work machine is traveling over rough or uneven terrain and hits a bump or a rut. The damping system dampens the force by dissipating some of the energy as heat to a hydraulic fluid.

The damping system of the present invention allows the damping effect to be adjusted depending upon the operating conditions of the work machine. By increasing the damping effect, the stability of the work machine may be increased. This increased stability may translate to increased operator comfort when moving large loads. The increased operator comfort will allow the work machine to be utilized to its fall potential. The disclosed damping system has application, therefore, in a wide variety of work machines to provide a more efficient operation.

It will be apparent to those skilled in the art that various modifications and variations can be made in the damping system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A damping system for an axle configured to pivot about a pivot point, comprising:
    a first hydraulic cylinder connected to the axle on one side of the pivot point and having a first chamber and a second chamber;
    a second hydraulic cylinder connected to the axle on the other side of the pivot point and having a third chamber and a fourth chamber:
    a first fluid line connecting the first chamber with the fourth chamber;
    a second fluid line connecting the second chamber with the third chamber;
    a restricted fluid passageway connecting the first fluid line and the second fluid line;
    a valve mechanism disposed between the first fluid line and the second fluid line and operable to release fluid from one of the first and second fluid lines when the pressure of the fluid in the one of the first and second fluid lines reaches a predetermined level; and
    a control mechanism operatively engaged with the valve mechanism to change the predetermined level depending upon operating conditions.

2. The damping system of claim 1, wherein the valve mechanism includes a first pressure relief valve configured to release fluid from the second fluid line to the first fluid line and a second pressure relief valve configured to release fluid from the first fluid line to the second fluid line.

3. The damping system of claim 1, wherein the valve mechanism includes a pressure relief valve in fluid communication with the first and second fluid lines and configured to release fluid to a tank.

4. The damping system of claim 1, wherein the restricted fluid passageway includes a valve having an orifice restricting the rate of fluid flow therethrough.

5. The damping system of claim 4, wherein the control mechanism is operable to adjust the size of the orifice.

6. A work machine, comprising:
    a chassis;
    an axle connected to the chassis and configured to pivot about a pivot point;
    a first hydraulic cylinder having a housing mounted on the chassis and a rod connected to the axle on one side of the pivot point, the first hydraulic cylinder having a first chamber and a second chamber;
    a second hydraulic cylinder having a housing mounted on the chassis and a rod connected to the axle on the other side of the pivot point, the second hydraulic chamber having a third chamber and a fourth chamber;
    a first fluid line connecting the first chamber with the fourth chamber;
    a second fluid line connecting the second chamber with the third chamber;
    a restricted fluid passageway connecting the first fluid line and the second fluid line to damp pivot movement of the axle about the pivot point;
    a valve mechanism disposed between the first fluid line and the second fluid line and operable to release fluid from one of the first and second fluid lines when the pressure of the fluid in the one of the first and second fluid lines reaches a predetermined level; and a control mechanism operatively engaged with the valve mechanism to change the predetermined level depending upon operating conditions.

7. The work machine of claim 6, wherein the valve mechanism includes a first pressure relief valve configured to release fluid from the first fluid line to the second fluid line and a second pressure relief valve configured to release fluid from the second fluid line to the first fluid line.

8. The work machine of claim 6, further including a work implement and wherein the control mechanism changes the predetermined level based on the elevation of the work implement.

9. The work machine of claim 6, wherein the valve mechanism includes a pressure relief valve in fluid communication with the first and second fluid lines and configured to release fluid to a tank.

10. The work machine of claim 6, wherein the restricted fluid passageway includes a valve having an orifice restricting the rate of fluid flow therethrough.

11. The work machine of claim 10, further including a control mechanism operable to adjust the size of the orifice.

12. The work machine of claim 11, further including a work implement and wherein the control mechanism adjusts the size of the orifice based on the elevation of the work implement.

13. A method of damping an axle, comprising:

connecting a first hydraulic cylinder having a first chamber and a second chamber to one end of the axle;

connecting a second hydraulic cylinder having a third chamber and a fourth chamber to the other end of the axle;

placing the first chamber in fluid communication with the fourth chamber through a first fluid line and the second chamber in fluid communication with the third chamber through a second fluid line;

allowing a restricted flow of fluid between the first fluid line and the second fluid line to damp pivot movement of the axle about a pivot point;

releasing fluid from one of the first and second fluid lines when the pressure of the fluid in the one of the first and second fluid lines reaches a predetermined pressure level; and changing the predetermined pressure level based upon operating conditions.

14. The method of claim 13, further including the step of adjusting the rate of the restricted flow of fluid based upon operating conditions.

15. The method of claim 14, wherein the rate of the restricted flow of fluid is adjusted based on the elevation of a work implement.

16. The method of claim 13, wherein the predetermined pressure level is changed based on the elevation of a work implement.

17. A damping system for an axle configured to pivot about a pivot point, comprising:

a first hydraulic cylinder connected to the axle on one side of the pivot point and having a first chamber and a second chamber;

a second hydraulic cylinder connected to the axle on the other side of the pivot point and having a third chamber and a fourth chamber;

a first fluid line connecting the first chamber with the fourth chamber;

a second fluid line connecting the second chamber with the third chamber;

a restricted fluid passageway connecting the first fluid line and the second fluid line, the restricted fluid passageway including an adjustable orifice; and a first pressure relief valve configured to release fluid from the second fluid line to the first fluid line when the pressure of the fluid in the second fluid line reaches a predetermined level;

a second pressure relief valve configured to release fluid from the first second fluid line to the second fluid line when the pressure of the fluid in the first fluid line reaches the predetermined level; and a control mechanism operatively engaged with the first and second pressure relief valves to change the predetermined level depending upon operating conditions.

18. A damping system for an axle configured to pivot about a pivot point, comprising:

a first hydraulic cylinder connected to the axle on one side of the pivot point and having a first chamber and a second chamber;

a second hydraulic cylinder connected to the axle on the other side of the pivot point and having a third chamber and a fourth chamber;

a first fluid line connecting the first chamber with the fourth chamber;

a second fluid line connecting the second chamber with the third chamber;

a restricted fluid passageway connecting the first fluid line and the second fluid line, the restricted fluid passage way having an orifice restricting the rate of fluid flow therethrough;

a valve mechanism disposed between the first fluid line and the second fluid line and operable to release fluid from one of the first and second fluid lines when the pressure of the fluid in the one of the first and second fluid lines reaches a predetermined level; and a control mechanism operatively engaged with the valve mechanism to change the predetermined level depending upon operating conditions.

* * * * *